United States Patent
Juergensen (10) Patent No.: US 8,952,820 B2
(45) Date of Patent: Feb. 10, 2015

(54) ENHANCED DIVE COMPUTER FUNCTIONALITY AND ASSOCIATED FEATURES

(76) Inventor: Kevin William Juergensen, Addison, PA (US)

(*) Notice: Subject to any disclaimer, the term of this patent is extended or adjusted under 35 U.S.C. 154(b) by 119 days.

(21) Appl. No.: 13/487,981

(22) Filed: Jun. 4, 2012

(65) Prior Publication Data

US 2013/0257621 A1 Oct. 3, 2013

Related U.S. Application Data

(60) Provisional application No. 61/618,529, filed on Mar. 30, 2012.

(51) Int. Cl.
*G08B 21/00* (2006.01)

(52) U.S. Cl.
USPC ........... 340/626; 702/139; 702/152; 73/865.1

(58) Field of Classification Search
USPC ........ 340/626; 702/152, 139, 47, 50, 98, 138, 702/189; 73/865.1; 405/186
See application file for complete search history.

(56) References Cited

U.S. PATENT DOCUMENTS

| | | | | | |
|---|---|---|---|---|---|
| 5,499,179 | A | * | 3/1996 | Sato | 128/201.27 |
| 5,845,235 | A | * | 12/1998 | Luukkanen et al. | 702/127 |
| 6,807,127 | B2 | * | 10/2004 | McGeever, Jr. | 367/128 |
| 6,856,578 | B2 | * | 2/2005 | Magine et al. | 367/134 |
| 6,972,715 | B2 | * | 12/2005 | Hollis et al. | 342/357.57 |
| 7,383,150 | B2 | * | 6/2008 | Angelini et al. | 702/139 |
| 2006/0224352 | A1 | * | 10/2006 | Baer et al. | 702/150 |

* cited by examiner

*Primary Examiner* — Toan N Pham
(74) *Attorney, Agent, or Firm* — Powley & Gibson, P.C.

(57) ABSTRACT

An enhanced dive computer functionality providing a diver positioning system integrated into a dive computer and a modified Display Integrated Vibrating Alarm device controlled by the dive computer to allow for decompression integrated guidance and a buddy signalling device. The diver positioning system allows for automatically determining the diver's position by tracking the diver's location in three dimensions within a water column, or portion of the body of water in which the diver operates bounded by the surface and the maximum dive depth, during a dive. A modified Display Integrated Vibrating Alarm allows for guiding a diver through a controlled decompression ascent and a method for automatically warning companion or nearby divers of imminent danger of injury or death to a subject diver.

19 Claims, 4 Drawing Sheets

ENHANCED DIVE COMPUTER FUNCTIONALITY AND ASSOCIATED FEATURES

RELATED APPLICATIONS

This application is related to Provisional Application Ser. No. 61/618,529 filed Mar. 30, 2012 entitled "DIVER GUIDANCE AND WARNING SYSTEM" to which priority under 35 U.S.C. §119 is claimed.

FIELD OF THE INVENTION

The present invention generally relates to enhanced dive computer functionality. More particularly, the present invention in some embodiments relates to a diver positioning system integrated into a dive computer and a modified Display Integrated Vibrating Alarm device controlled by the dive computer to allow for decompression integrated guidance and buddy signalling device. Further embodiments of the invention relate to methods of determining a dive position, guiding a diver through a controlled decompression ascent and a method for automatically warning companion or nearby divers of imminent danger of injury or death to a subject diver.

BACKGROUND OF THE INVENTION

Underwater diving is a growing activity around the globe, whether it is for commercial, recreational and military purposes. Diving is also a hazardous activity, and serious or fatal accidents occur regularly. One Japanese study conducted in 2000 determined that every hour of recreational diving is 36 to 62 times riskier than driving an automobile.

There are a myriad of dangers that a diver faces during a dive. These dangers/hazards can be categorized as follows— specific diving environment (silt, overhead environment (cave, wreck, etc.) low visibility, darkness, etc.) use of breathing equipment (carbon monoxide contamination of breathing gas, oxygen partial pressure in breathing gas is too low, loss of breathing gas supply, excessive carbon dioxide in breathing gas, etc.), pressure changes during descent, pressure changes during ascent (lung overpressure, middle ear overpressure, etc.), breathing gases at high ambient pressure, pre-existing physiological and psychological conditions of the diver, failure of diving equipment other than breathing apparatus, etc.

Most of the hazards listed are dormant or potential, with only a theoretical risk of harm. Once the hazard becomes active, it creates an emergency situation.

One of the dangers facing divers is knowing their precise position underwater. Most scuba divers carry a compass. A compass alone does not help but rather requires the diver to use the compass bearings with known landmarks and the diver to estimate their distance from the landmark. In situations of strong currents or low visibility it will be difficult for the diver to locate known landmarks, let alone estimate the distance to the landmark.

Tethering the diver allows topside personnel to monitor and instruct a diver on their location. However, the diver is encumbered by the presence of an attached tether restricting the spatial length of the dive to the length of the tether. Other methods of positioning is the use of lines that can either be laid out between landmarks or attached to a weight in order to swim circular search patterns. Although these methods work, they also require the diver to be tethered and only provide a position relative to local objects.

Another common danger that faces divers, as mentioned above, is the pressure changes during ascent. Dive computers, generally worn on a diver's wrist or attached to the diver's suit by a retractable cord, address the same problem as decompression tables, but are able to perform a continuous calculation of the partial pressure of inert gases in the body based on the actual depth and time profile of the diver. Many dive computers also provide additional information to the diver including air and water temperature, data used to help prevent oxygen toxicity, a computer-readable dive log, and the pressure of the remaining breathing gas in the diving cylinder. As the dive computer automatically measures depth and time, it is able to warn of excessive ascent rates and missed decompression stops. However, because the dive computer is worn on the wrist or attached to the diver's suit, the diver may not be aware of any warnings displayed on the dive computer or may not hear an audible alarm.

Companion divers may not be aware of impending danger to a fellow diver without some visible warning, especially if the danger relates to irregularities in the diver's breathing loop. Also, there may be circumstances where a diver is aware of an impending danger to another diver and needs to gain the attention of the diver. Traditional hand signals may be missed or misunderstood, and audio warnings may not be heard because of the surrounding environment and head gear worn by divers.

BRIEF SUMMARY OF THE INVENTION

The foregoing and other problems and deficiencies in known diving situations are solved and a technical advantage is achieved by enhanced dive computer functionality, either separately or in conjunction with a Display Integrated Vibrating Alarm (DIVA), providing a novel method and system for tracking a diver's location in three dimensions in a body of water bounded by the surface and maximum dive depth during a dive, a novel method and system, Decompression Integrated Guidance (DIG), allowing a diver to control the decompression ascent from a scuba dive and a novel method and illuminating warning system, Buddy Signaling Device (BSD), for warning divers in the vicinity of an imminent danger of the present invention.

In accordance with an aspect of the present invention, there is provided a diver positioning system integrated into a dive computer for tracking the spatial location of a diver during a dive. The diver position system includes a global positioning system module, one or more wet switches, a pressure transducer, a digital compass, a three dimension accelerometer, a clock, a volatile memory source, a non-volatile memory source, and a microprocessor. The microprocessor is in communication with and receiving measurement data from the global positioning system module, one or more wet switches, pressure transducer, digital compass, three dimension accelerometer, clock, volatile memory source and non-volatile memory source. The microprocessor is configured to store the measurement data in the volatile memory source or non-volatile memory source, and calculate spatial location as a function of the measurement data.

In accordance with another aspect of the present invention, there is provided a dive computer controlling a modified Display Integrated Vibrating Alarm capable of allowing a driver to control the decompression ascent using a Decompression Integrated Guidance system. The system for assisting a diver with completing decompression stops during an ascent phase of a dive includes a display integrated vibrating alarm, a first light-emitting diode that is selectively energized in response to a first signal corresponding to the beginning of the ascent phase of the dive and that is selectively energized in response to a second signal corresponding to the completion of all decompression stops by the diver. A second light-emitting diode is selectively energized in response to a third signal corresponding to a rate of ascent that exceeds a predetermined safe rate of ascent, a third light-emitting diode is selectively energized in response to a fourth signal corresponding to the diver ascending to a depth within ten feet of the depth of a predetermined decompression stop, and a fourth light-emitting diode that is selectively energized in response to a fifth signal corresponding to the diver ascending to the depth of a predetermined decompression stop. A fifth light-emitting diode is selectively energized in response to a sixth signal corresponding to the diver ascending to a depth shallower than the depth of a predetermined decompression stop, a sixth light-emitting diode is selectively energized in response to a seventh signal corresponding to the diver ascending to a depth shallower than the depth of a predetermined decompression stop and that is selectively energized in response to an eighth signal corresponding to the diver ascending to a depth shallower than the depth of a predetermined decompression stop by more than ten feet, and a microprocessor. The microprocessor is configured to transmit the first, second, third, fourth, fifth, sixth, seventh and eighth signals to the first, second, third, fourth, fifth and sixth light-emitting diodes and to transmit confirmatory signals.

In accordance with yet a further aspect of the present invention there is provided a Buddy Signaling Device providing an illuminating alarm, either controlled by a dive computer or manually implemented by the diver to warn other divers in the vicinity of an impending danger either to the diver or divers. The system for warning of danger to a diver during a dive includes a display integrated vibrating alarm, seventh, eighth and ninth light-emitting diodes facing away from the diver and visible to other divers that are selectively energized individually or together in response to signals corresponding to status of the dive. A tenth and eleventh light-emitting diodes facing away from the diver and visible to other divers are selectively energized individually or together in response to signals corresponding to partial pressure of oxygen data that are less than a first preselected threshold value or greater than a second preselected threshold value or in response to manual selection by the diver. The system also includes a microprocessor configured to transmit the seventh, eighth, ninth, tenth and eleventh signals to the seventh, eighth, ninth, tenth and eleventh light-emitting diodes and to transmit confirmatory signals.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention can be embodied in different forms and thus should not be construed as being limited to the embodiments set forth herein.

DETAILED DESCRIPTION

The present subject matter will now be described more fully hereinafter with reference to the accompanying Figures, in which representative embodiments are shown. The present subject matter can, however, be embodied in different forms and should not be construed as limited to the embodiments set forth herein. Rather, these embodiments are provided to describe and enable one of skill in the art. Unless otherwise defined, all technical and scientific terms used herein have the same meaning as commonly understood by one of ordinary skill in the art to which the subject matter pertains. All publications, patent applications, patents, and other references mentioned herein are incorporated by reference in their entirety.

Figure 1:
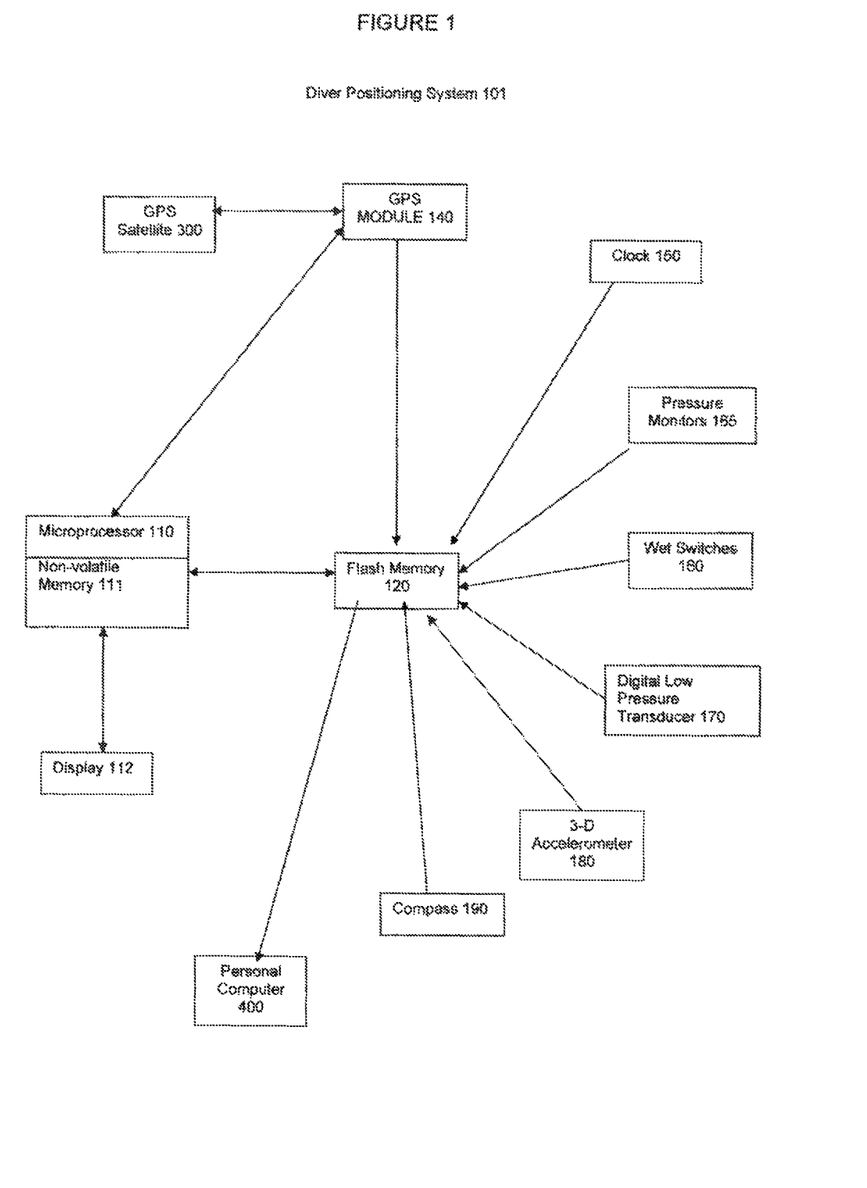
FIG. 1. shows a block diagram of an embodiment of the diver positioning system of the invention.

Referring to the drawings in detail, wherein like reference numerals indicate like elements throughout, there is shown in FIG. 1 an exemplary embodiment of the Diver Positioning System (DSP) (101). The DPS allows for tracking diver location in three dimensions within a water column, or portion of the body of water in which the diver operates bounded by the surface and the maximum dive depth, during a dive. The DSP may be integrated and housed in a dive computer (100), utilizing the dive computer's features and functions. Alternatively, one or more of the DSP's modules, described later, may be located separate from the dive computer (100) in one or more hermetically sealed housings (not shown). The hermetically sealed housing or housings are waterproof resistant and resistant to pressure associated with a dive depth of at least 100 meters and to a maximum dive depth of 300 meters. The diver computer (100) may be integrated with a rebreather controller (not shown).

The dive computer (100) may be worn on the wrist of the diver, like a traditional watch. Alternatively, the dive computer (100) may be clipped/attached anywhere on the body of the diver. The location of the dive computer (100) on the diver's body is determined by the diver's preference.

The Diver Positioning System utilizes a Microprocessor (110) which can either be the dive computer's (100) microprocessor or a separate microprocessor integrated into the dive computer and stores among other information a program employing an algorithm to determine a diver's position by the information acquired from various modules described below.

Integrated into the DSP is a Global Positioning System (GPS) module (140) that when powered on by dive computer/rebreather controller (100) will detect and locate the diver's geographic position by receiving location signal data transmitted from a GPS satellite (300).

Integrated into the dive computer (100) is a Real Time Clock (150) which is a high accuracy digital device which is calibrated automatically by the dive computer's onboard Global Positioning System module (140) with Universal Time Data from the GPS Satellite (300).

Using data from the GPS module (140), the DSP will automatically reset the clock module's (150) time in the dive computer/rebreather controller (100) to current time based on the diver's location on Earth.

Integrated one or more Wet Switches (160) and or one or more Pressure Monitors (165) detect when a diver is submerged. The Wet Switches (160) are located on the outside of a pressure housing (not shown) that is part of the diver computer's (100) housing. The Wet Switches (160) are connected through the casing/housing of the dive computer's (100) housing to the associated electronics. If Wet Switches (160) are not used to detect whether the diver is submerged, the Diver Positioning System may use Pressure Monitors (165) to sense that a diver is submerged by a change in pressure. The diver's geographic location data determined by the GPS module (140) at powering on the dive computer/rebreather controller (100) is placed into non-volatile Flash Memory (120) to be recorded with all subsequent accumulated data.

Integrated into the dive computer/rebreather controller (100) is a Digital Compass (190), which records the diver's orientation in 1 Hz intervals. The diver may confirm on the dive computer (100) or Digital Compass (190) the position of the dive computer (100) on the diver's body ensuring accurate readings of the Digital Compass (190). This data is logged in non-volatile Flash Memory (120) to be recorded with all subsequent data accumulated. In some embodiments, the Digital Compass (190) is mounted inside a Wrist Unit in a plane parallel to the user viewpoint. In some embodiments, the Digital Compass (190) is mounted inside a Gimbal arrangement in the Head of the breathing apparatus for future implementation. Other mounting configurations are contemplated.

Also integrated into the dive computer (100) is a Digital Low Pressure Transducer (170) which senses water pressure, which is then translated by the dive computer into a highly accurate depth reading, which is logged in non-volatile Flash Memory (120) in 1 Hz intervals.

A Three Dimension Accelerometer (180) is also integrated into the dive computer (100). The Three Dimension Accelerometer (180) detects motion in 3 different axis. As with the other data from the Diver Positioning System modules the data from the Three Dimension Accelerometer (180) is logged in non-volatile Flash Memory (120) in 1 Hz intervals.

An illustrative embodiment of the operation of an embodiment of the present invention will now be described. At Power Up, the program stored in the Microprocessor (110) polls the Wet Switches (160) to determine if the resistance across twin switch leads, (which are located on the outside of the pressure housing, and thus, able to come into direct contact with the water), are measuring an Electrical Resistance (measured in Ohms) equivalent to either Fresh Water or Salt Water as would be seen during immersion. If the Wet Switches (160) indicate a True condition (meaning, if the unit determines that it is submerged), the Microprocessor (110) then queries the Digital Low Pressure Transducer (170), which measures pressure from Zero mBar (deep space) to 14 Atmospheres (the equivalent of 205 pounds per square inch (PSI) or 462 feet of sea water). If the Digital Low Pressure Transducer (170) reports a pressure of less than 1013 mBar (the average pressure of the Earth at Sea Level), then the Microprocessor (110) goes into Wait Mode.

If the Digital Low Pressure Transducer (170) reports a pressure of greater than 1014 mBar, then the Microprocessor (110), i.e., the dive computer 100 goes into Diving Mode. In Diving Mode, the Microprocessor (110) stores the last GPS Value that was in temporary memory and places it in memory (111), either a non-volatile memory source or a volatile memory source. The Microprocessor (110) then shuts down Power to the GPS module (140).

The Microprocessor (110) then begins to log into memory (111), initially Random Access Memory (RAM) located on the Microprocessor (110), all of the parameters reported to it by all external devices. The Microprocessor (110) uses the RAM 111 to buffer the data before writing it to the non-volatile Flash Memory (120). The parameters (data) reported to the Microprocessor may include:

Depth (LPT)
Time (RTC)
Compass Position
Temperature
Oxygen Sensor Output
User Selected Oxygen Set Point
User Selected Decompression Factor
Decompression Tissue Compartment Data
Gas Selection
Lamp Condition (LCD Display Backlight)
LCD Orientation (Portrait or Landscape)
Accelerometer Data
DIVA Condition—Commands
DIVA Condition—Executed Acknowledgement Using the data acquired from the GPS module (140) prior to the GPS module (140) powering down, the Digital Low Pressure Transducer (170), the Digital Compass (190), the Three Dimensional Accelerometer (180), and the Real Time Clock (150), the dive computer (100) applies an algorithm to determine the diver's exact location in three dimensions in a column or body of water.

Figure 2:
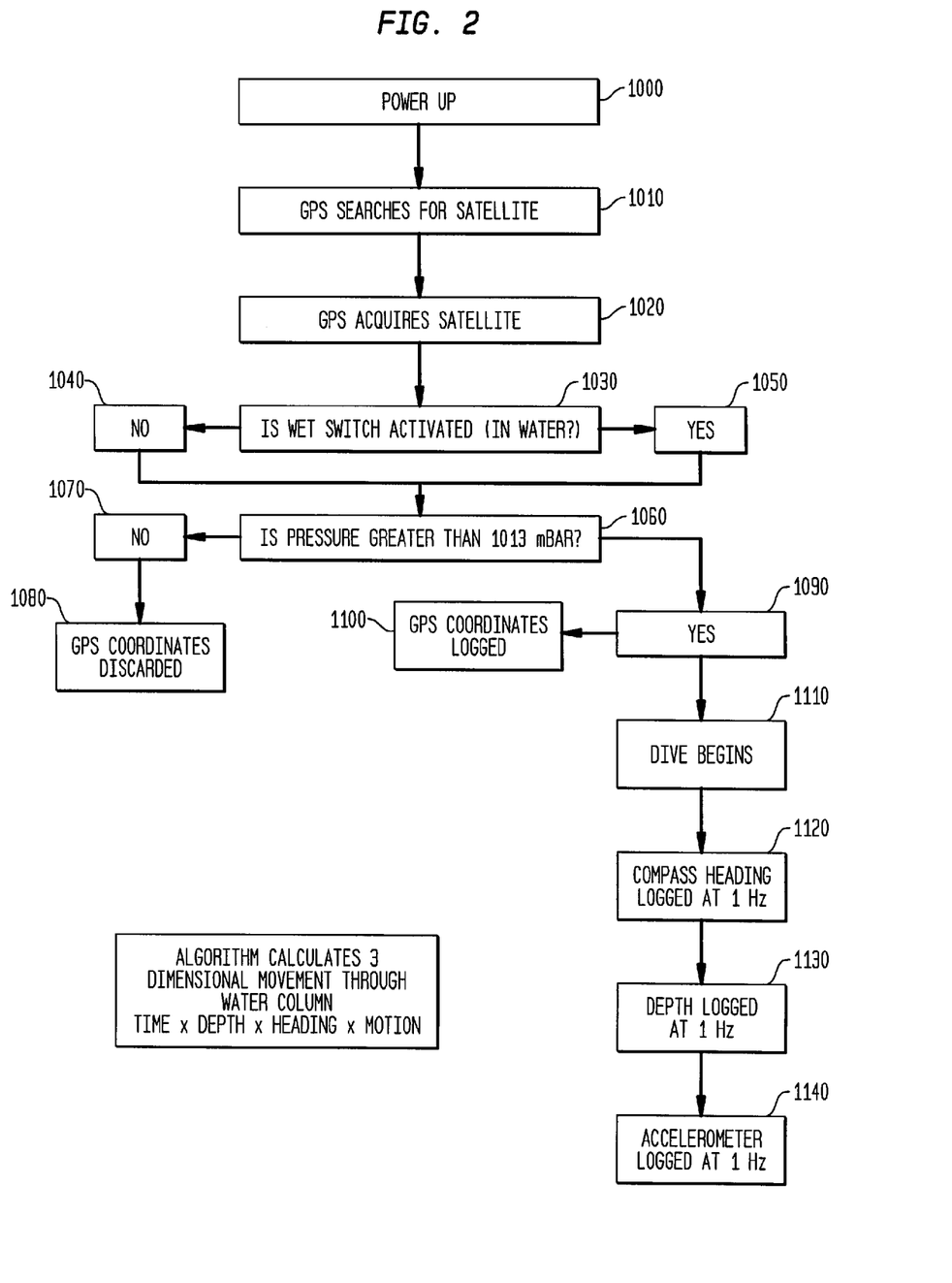
FIG. 2 shows a logic diagram of the functioning of an embodiment the diver positioning system of the invention.

The inventive method is illustrated in FIG. 2. As stated previously, at Power UP (1000) of the dive computer (100) the GPS module (140) searches for a satellite signal (1010). Once the GPS module (140) acquires a satellite signal (1020) the Microprocessor queries the Wet Switches (160) to determine if the Wet Switches are activated (in contact with water) (1030). If the Wet Switches are not activated (1040) then the Microprocessor (110) continues to query the Wet Switches (160) until the Wet Switches are activated (1050). The Microprocessor (110) is "notified" if the Wet Switch (160) is activated because one of the inputs (not shown) to the Microprocessor (110) is constantly monitoring if a transistor (not shown) on the Wet Switch (160) is activated. Once the Wet Switches (160) are activated, the Microprocessor (110) queries the Digital Low Pressure Transducer (170) to determine if the pressure measured is greater than 1013 mBar (1060). If the pressure is not greater than 1013 mBar (1070) then the GPS coordinates are discarded. New GPS coordinates are received and discarded until the pressure exceeds 1013 mBar (1090). At this point, the GPS coordinates are logged (1100) and the Microprocessor (110) powers down the GPS module (140).

When the measured pressure exceeds 1013 mBar, the Microprocessor determines that the dive has begun (1110). Once the dive has begun, the compass heading (1120) determined by the Digital Compass (190), the depth (1130) of the diver as determined by the Digital Low Pressure Transducer (170) and the Three Dimension Accelerometer data (1140) are all logged into the non-volatile Flash Memory (120). This information is derived on a continuous basis from data stored in non-volatile Flash Memory at a rate of 1 Hz. With this data, a diver using the Diver Positioning System may measure waypoints, either automatically based on a predetermined frequency or manually along their path through the water, thereby allowing the diver to retrace the path they took to find their way back to the point of the origin of the dive.

In a prophetic example, a diver utilizing the Diver Positioning System of the present invention may enter the water and descend to a sunken shipwreck. The DPS has stored the geographic location where the diver entered the water using the GPS module (140). The depth of the diver's descent into the water is logged by the Low Pressure Transducer (170), and their orientation is logged by the Digital Compass (190). The diver's movement forward or backward in relation to either of these stored measurements is also logged by the Three Dimensional Accelerometer (180). The Real Time Clock (150) logs the amount of time between readings in highly accurate 1 second intervals.

In the example, the diver enters the sunken shipwreck and begins to travel between the various decks of the ship, turning left, right, up and down through various passageways until the diver ultimately reaches the engine room of the sunken ship. Again, Depth, Time, Movement, and Global Orientation (compass) is continuously logged by the DPS of the dive computer. In furtherance of the example, the passageways the diver has passed through become filled with floating silt due to improper finning of the diver or by other divers, resulting in near complete loss of visibility within the ship. This is a well documented cause of dozens of diver fatalities over the years, and represents a very real danger to divers who engage in wreck diving.

Using the DPS the diver, however, has the ability to use the waypoints (the real-time tracked positional data derived from the dive computer algorithm) to reverse his course by following cues given by the DPS of the dive computer via a display module (112)) providing either alpha-numeric or graphical, or a combination of alpha-numeric and graphical data. The diver can accurately retrace his position through the ship using only the display (112) of the dive computer as his guide, which will return him to the point of the origin of the dive itself.

Upon safe return to the surface, all of the information stored in non-volatile Flash Memory (120) can be downloaded into a Personal Computer (400) for additional analysis or documentation.

By way of illustrative examples, those skilled in the art will understand in view of the foregoing illustrative embodiments that the dive computer's power supply (not shown) may be used for energizing the modules of the Diver Positioning System. Alternatively, such power supply functionality may be partitioned between the modules internal and external to the Diver Positioning System.

Figure 3:
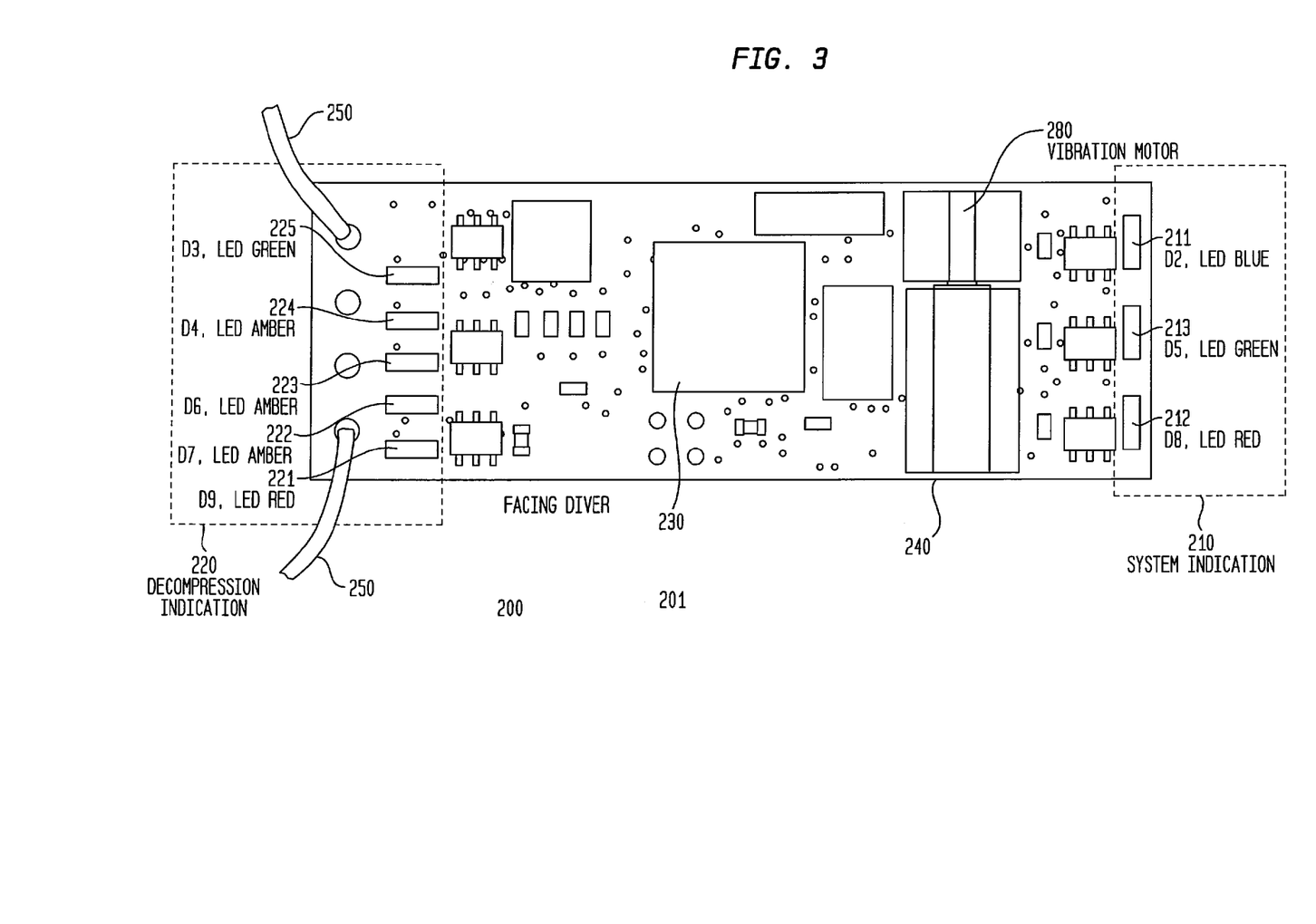
FIG. 3 shows a circuit board layout of an embodiment of the DIVA Decompression Integrated Guidance (DIG) system of the invention.

In another embodiment of an enhanced diver computer functionality is an integrated/combined Display Integrated Vibrating Alarm—Decompression Integrated Guidance (DIVA-DIG) (201) (FIG. 3) and Display Integrated Vibrating Alarm—Buddy Signaling Device (DIVA-BSD) (202) (200) (FIG. 4), allowing a diver to control the diver's decompression ascent from a scuba dive and automatically warning buddies, or divers who may be located in the general vicinity of the subject diver, of imminent danger of injury or death to the subject diver. FIG. 3 depicts one side of a circuit board (240) assembly housing the DIVA-DIG (201). The opposite side of the circuit board (240) assembly houses the DIVA-BSD (202) (FIG. 4) described later.

It is contemplated that the DIG and or the BSD may be separate and not integrated with a DIVA as disclosed U.S. Pat. Nos. 7,628,153 and 8,028,696, which are incorporated herein in their entirety. However, the following description describes an embodiment where the DIVA is modified to include the functionality of a DIG and BSD.

The diver is fitted with a Display Integrated Vibrating Alarm (DIVA) which has been modified to include a Circuit Board (240) multiple Light Emitting Diodes (210, 220), as well as a Microprocessor (230) so that a novel algorithm, controlled by the dive computer, can be applied to the lighting of the LED's during diving decompression activity. The DIVA is disclosed by U.S. Pat. No. 7,628,153, which is incorporated herein by reference in its entirety. The Circuit Board (240) multiple Light Emitting Diodes (210, 220) and Microprocessor (230) are housed in a hermetically seal unit (not shown) that may be mounted onto the DIVA casing or integrated into the DIVA housing as described in U.S. Pat. Nos. 7,628,153 and 8,028,696. The hermetically sealed unit is constructed to allow one or more transparent window allowing the diver to view the multiple LEDs without restriction.

As noted in U.S. Pat. Nos. 7,628,153 and 8,028,696, the DIVA may be mounted on a bracket attached to the Dive Surface Valve (DSV) (not shown), providing unrestricted view by the diver to the DIVA and more importantly to the LEDs of the DIVA-DIG. Other methods for deploying the DIVA-DIG (200) are contemplated.

The Microprocessor (230) placed on the DIVA-DIG communicates with the Master Controller (not shown) to display the Status of the diver's breathing apparatus based on commands given by the Master Controller. The Microprocessor (230) functions as a "SLAVE" changing the light sequence and vibrator based upon commands sent by the Microprocessor (Master Controller) on the wrist unit worn on the diver's wrist via a RS-485 communications protocol. It is, however, contemplated that any number of communications protocols may be used. An advantage of the RS-485 communications protocol, as known as "Differential Communications" is that is better at resisting interference from extraneous sources. Power is also supplied by the wrist unit to the DIVA-DIG (201) via a 2 wire (positive and negative) (250) connection.

The Microprocessor (230) on the DIVA-DIG (201), after executing commands from the Master Controller, transmits signals back to the Master Controller confirming it has executed the commands, so that the Master Controller can place the acknowledgement of command acceptance in non-volatile Flash Memory. This enables forensic evaluation of the dive once the diver has returned to the surface and the Master Controller has passed the contents of its Flash Memory dive log to a Personal Computer (PC) (not shown). The PC then displays not only the other stored data points, but also the condition of the DIVA-DIG display as well, including any warnings or specific LED activations.

As may be appreciated, in various implementations, a conduit as described in U.S. Pat. Nos. 7,628,153 and 8,028,696 may be implemented to include one or more electrical conductors (e.g., wires), and additionally or alternatively, one or more signals may be provided by, for example, an optical or pressure signal provided via the conduit from the Master Controller to the modified DIVA (The U.S. Pat. Nos. 7,628, 153 and 8,028,696 DIVA as modified to include the Decompression Integrated Guidance and the Buddy Signaling Device systems described herein.). Similarly, communications may be accomplished wirelessly.

The orientation of the Light Emitting Diode banks (LEDs), System Indication (210) and the Decompression Indication (220) on the device is shown in FIG. 3. The orientation, as may be appreciated depends on which side the diver mounts the DIVA. The orientation of FIG. 4 for the placement of the LEDs on the circuit board 240 is facing the diver. Thus, the System Indication (210) appears to the diver on the diver's right and the Decompression Indication (220) appears to the diver on the diver's left. The System Indication (210) may include three LEDs, D2 a Blue LED (211), D8 a Red LED (212), and D5 a Green LED (213). The System Indication (210) is used in conjunction with the DIVA-Buddy Signaling Device (embodiment described later). The Red and Green diodes (212, 213) serve a similar function to the diode(s) found on the existing DIVA which is subject of the patents identified above. The System Indication LEDs of FIG. 4 replaces the diode(s) on the DIVA described in the aforementioned patents. The Decompression Indication (220) may include five LEDs, D9 a Red LED (221), D7 an Amber LED (222), D6 an Amber LED (223), D4 an Amber LED (224) and D3 a Green LED (225).

The Microprocessor (230) transmits signals to the System Indication (210) and Decompression Indication (220) in response to commands from the Master Controller to assist the diver in completing the decompression stops during an ascent phase of a dive.

In a prophetic example of the inventive system and method in operation, when a diver has completed the Maximum Operating Depth portion of their dive, some Decompression Stops at specified depths, ranging from just a few minutes to several hours per stop, may be required during the ascent phase of the dive depending upon the depth, duration, and type of inert gas the diver was using in order to prevent the diver from suffering decompression sickness. The decompression stops are calculated by the dive computer, with which the DIVA-DIG (201) is integrated via a digital communications link.

Upon the beginning of the Ascent Phase of the dive, the DIVA-DIG (201) is activated, either automatically by an algorithm integrated into the firmware of the dive computer, or by the diver selecting activation of the DIVA-DIG in a Menu on the dive computer display.

Upon activation, the Green LED (225) on the DIVA-DIG (201) begins to pulse at a rate of approximately 15-20 Hz, which is distinct from the pulsing of the System Indication (210) LEDs of the DIVA-DIG (201). This pulsing Green LED (225) indicates that the diver is free to ascend in the water column.

Should the diver exceed the Safe Ascent Rate (SAR) as determined by the dive computer, the Blue LED (211) will begin to pulse at a rate of 3 Hz, followed by short 2 Hz activations of the built-in Vibrating Motor 280 of the DIVA. This warns the diver to slow the ascent to a safe rate.

Once the diver is within a predetermined distance, such as ten feet or less, from a decompression stop calculated by the dive computer, which is the minimum depth to which is safe for the diver to ascend while minimizing the risk of decompression sickness, the Amber LED (224) just below the Green LED (225) will begin to pulse at a varying rate—fast to slow—proportional to the decrease in distance to the decompression stop.

Once the diver has reached the decompression stop, the Green LED (225) and Amber LED (224) now flashing very fast, for example 15 Hz, become inactive, and the center Amber LED (223) will begin to pulse at a rate of 15-20 Hz, mimicking the pattern of the Green LED (225). This indicates that the diver is at the decompression stop as defined by the dive computer. The DIVA-DIG (201) allows the diver, by simply using visual cues to recognize the decompression stop "hands-free" without the need to look at the dive computer for an exact depth reading given in numerical format.

In the event the diver exceeds the minimum depth to which the diver may safely ascend, as determined by the dive computer, the Microprocessor 230 upon command from the Master Controller will activate the Amber LED (222) located below the center Amber LED (223) and the Red LED (221) below the Amber LED (222) in a pattern which is the inverse of the Green LED/Amber LED (225, 224) combination. If a diver exceeds the minimum ceiling which the dive computer has determined is safe by more than ten feet, the Red LED (221) will begin to flash in a warning pattern of 4 Hz, notifying the diver that they are in danger of Decompression Sickness by violating the safe decompression stop requirements generated by the dive computer. A diver may then descend to the proper depth to stop the alarm on the DIVA-DIG (201) from warning them. The violation, however, is logged by the dive computer in non-volatile memory.

When a decompression stop has been completed by the diver and is cleared by the dive computer, i.e., the dive computer has determined through use of its decompression calculations that the diver is clear to ascend to the next decompression stop, usually in 10 foot increments of depth, then the foregoing method is repeated for the next compression stop.

When the diver has completed all decompression stops called for by the dive computer, the DIVA-DIG (201) notifies the diver that it is clear to ascend, by flashing the Green LED (225) in a 15-20 Hz pattern without the use of the Amber LED (224).

As stated previously, the dive computer/Master Controller sends signals to the Microprocessor 230 regarding the decompression stops and the rate of ascent by the diver. The Microprocessor then transmits signals to the LEDs to selectively active one or more LED. Upon execution of a command from the Master Controller, the Microprocessor (230) transmits a confirmatory signal back to the Master Controller.

Additionally, the System Indication (210) located on the DIVA-DIG (201) can be activated to transmit the subject diver's life support status as controlled by the DIVA-BSD (202), discussed later. Due to the orientation of the DIVA-DIG's (201) LEDs facing the diver, the diver is readily alerted to an imminent danger to him.

In another embodiment of an enhanced diver computer functionality is a Display Integrated Vibrating Alarm—Buddy Signaling Device (DIVA-BSD) (202) (FIG. 4) automatically warning buddies, or divers who may be located in the general vicinity of the subject diver, of imminent danger of injury or death to the subject diver due to irregularities in the diver's breathing loop, or, when activated by the subject diver, to gain the attention of the diver's buddies for purposes other than warnings of danger.

Figure 4:
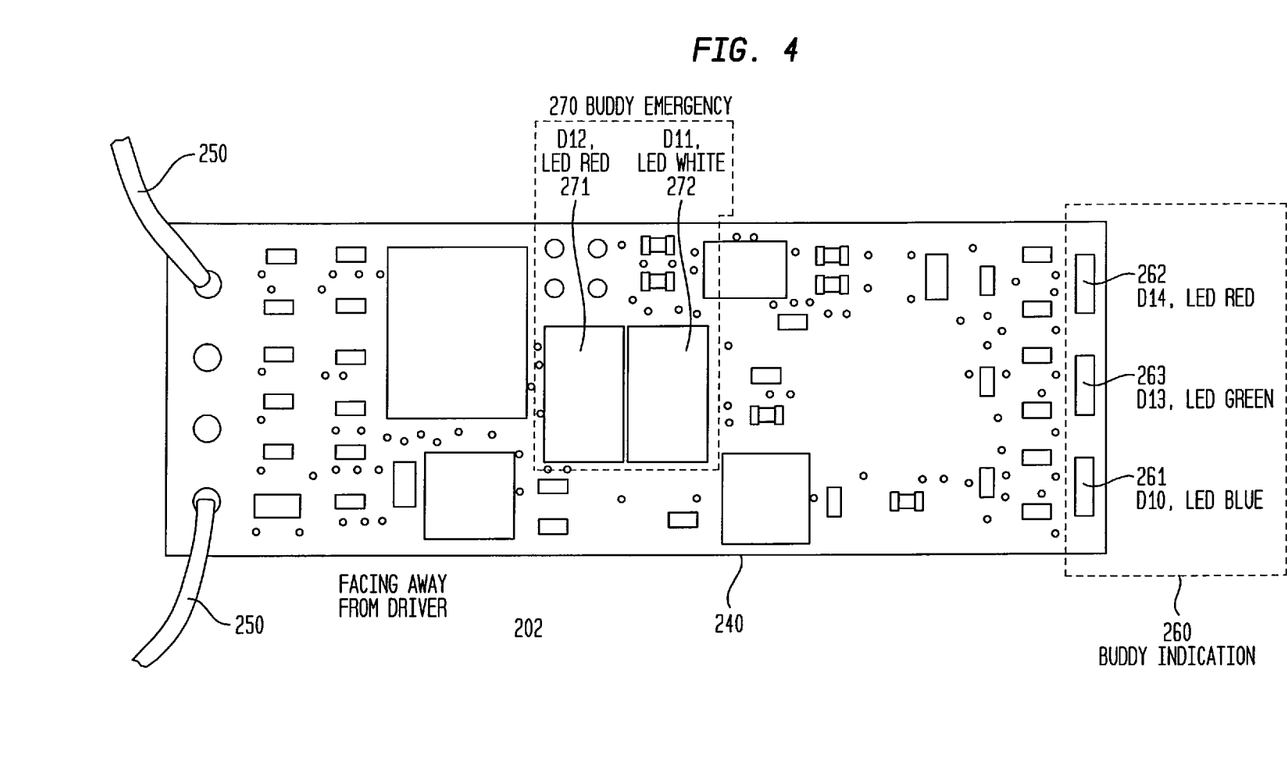
FIG. 4 shows a circuit board layout of an embodiment of the DIVA Buddy Signaling Device (BSD) system of the invention.

As stated previously the DIVA-BSD (202) circuitry, depicted in FIG. 4 is located on the opposite (with reference to the DIVA-DIG (201) component side) or second side of circuit board (240).

The DIVA-BSD (202) utilizes the same circuitry as the DIVA-DIG (201) for controlling LED Banks 240 and 250, and the DIVA-BSD communicates and/or is controlled by the Master Controller, discussed above.

The DIVA-BSD is located opposite to the DIVA-DIG and consists of 2 Light Emitting Diode banks, a Buddy Indication (260) and a Buddy Emergency Indication (270) as shown in FIG. 4. FIG. 43 depicts the orientation of the Buddy Indication (260) and the Buddy Emergency Indication (270) from the perspective of facing away from the subject diver. That is, the Buddy Indication (260) is located on the diver's right. As stated previously, the orientation of the LEDs is dependent on which side the diver mounts the DIVA.

The Buddy Indication (260) may include three Light Emitting Diodes—D10 a Blue LED (261), D14 a Red LED (262), and D13 a Green LED (263). These LEDs which, when activated by the diver, mimic the System Indication (210) LEDs which face the diver. This feature enables another diver (such as an Instructor) to visually inspect the life support status of the diver's breathing loop quickly.

In the Center of the circuit board (240) are located two large LED's—D12 a Red LED (271) and D11 a White LED (272) which comprise the Buddy Emergency Indication (270). The Red (271) LED is on the left of the White (272) LED. These are ultra-bright models of LED which when activated (automatically by the dive computer, or manually by the diver) flash RED/WHITE/RED/WHITE at a rate of 2 Hz for Emergency Mode, or RED/RED/RED/WHITE at a rate of 4 Hz for Signal Mode.

Emergency Mode: In the event the Partial Pressure of Oxygen ($ppO_2$) of the diver's breathing loop drops below a preselected threshold value, such as 0.19 Atmospheres, or rises above a preselected threshold value, such as 1.80 Atmospheres, the dive computer will automatically activate the DIVA-BSD Red/White Signaling LED's via Microprocessor (230) in the Emergency Mode pattern. These LED's are very bright, and are designed to cause divers in the vicinity to see the flashing in their peripheral vision to call attention to the diver experiencing the emergency. When the ppO$_2$ returns to normal, the DIVA-BSD ceases activating the Red/White LEDs.

The diver may also elect to enable the Emergency Mode manually via a Menu located in the dive computer should the diver be in distress and want to call attention from other divers in the vicinity underwater.

In the event the diver wishes to signal other divers in the vicinity underwater, the diver may elect to activate a Signal Mode on the DIVA-BSD which then allows him to activate a RED/RED/RED/WHITE signal flashing mode of the Red and White LEDs (271, 272) to gain the attention of other divers. The pattern of flashing differs from the Emergency Mode so that divers are aware that it is only a Signal and not an Emergency. This activation is manually invoked using the Menu system (not shown) on the dive computer.

Another feature of the DIVA-BSD is that in the event the diver loses a primary source of underwater illumination, such as a flashlight or torch, the diver may elect to activate only the White LED (272) for a period of time which they may determine by using a Menu located in the dive computer. Since the White LED (272) is facing away from the diver's face, it will serve as an illumination for the diver to see through the darkness.

The present invention has been illustrated and described with reference to particular embodiments and applications thereof. It will be readily apparent to those skilled in that art that the present invention will have applications beyond those described herein for purposes of description of the invention. For example, the present invention can be adapted for use in any environment where flexible structure formation is desired by implementing the principals taught herein.

To facilitate discussion of the present invention, a preferred embodiment is assumed; however, the above-described embodiments are merely illustrative of the principals of the invention and are not intended to be exclusive embodiments thereof. It should be understood by one skilled in the art that alternative embodiments drawn to variations in the enumerated embodiments and teachings disclosed herein can be derived and implemented to realize the various benefits of the present invention. By way of example, it is understood that although the embodiments have been described with respect to specific configurations, in practice, and also depending on the application, different configurations may be allowed and/or certain other configurations may be desired.

Finally, it is further noted that while the system described and shown hereinabove in accordance with the present invention provide many useful features and advantages, any geometric designs and shapes of each of the individual components, as depicted in the various drawings, represent ornamental designs that may be subject to separate protection thereof.

It should be understood that various changes, substitutions, additions and alterations can be made by one skilled in the art without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure herein, processes, machines, manufacture, composition of matter, means, methods, or steps, presently existing or later to be developed that perform substantially the same function or achieve substantially the same result as the corresponding embodiments described herein may be utilized according to the present invention.

The invention claimed is:

1. A diver alert system integrated with a Display Integrated Vibrating Alarm system for assisting a diver during a dive, said system comprising:
a decompression integrated guidance subsystem controlling a diver's decompression ascent; and
a buddy signaling device subsystem for alerting other divers proximal to the diver,
wherein the alert system is mounted on a bracket giving the diver an unobstructed view of the alert system in a hands-free position, and wherein the decompression integrated guidance system provides visual cues, separate from a computer display, alerting the diver to various dive conditions, decompression stops, whether the safe ascent rate has been exceeded, and if the diver violated safe decompression stop requirements.

2. The diver alert system of claim 1, further comprising:
a circuit board;
a microprocessor mounted on a first side of the circuit board; and
multiple light emitting diodes mounted the first side and a second side of the circuit board provide the visual cues, wherein the first side of the circuit board faces the diver.

3. The diver alert system of claim 2, wherein the multiple light emitting diodes mounted on the first side of the circuit board comprises two groups, a system indication bank, and a decompression indication bank.

4. The diver alert system of claim 3, wherein the system indication bank of light emitting diodes (LED) comprises a blue LED, a red LED and a green LED.

5. The diver alert system of claim 3, wherein the decompression indication bank of light emitting diodes (LED) comprises a red LED, three amber LEDs, and a green LED.

6. The diver alert system of claim 3, wherein the system indication bank of light emitting diodes is activated either automatically by signals sent from the microprocessor or manually by the diver.

7. The diver alert system of claim 6, wherein one or more of the multiple light emitting diodes is activated based on a predetermined condition.

8. The diver alert system of claim 7, wherein when activated the one or more of the multiple light emitting diodes pulse at varying frequency rates depending on the predetermined condition.

9. The diver alert system of claim 6, wherein the microprocessor receives commands from the Display Integrated Vibrating Alarm system.

10. The diver alert system of claim 2, wherein the multiple light emitting diodes mounted on the second side of the circuit board comprises two groups, a buddy indication bank and a buddy emergency indication bank.

11. The diver alert system of claim 10, wherein the buddy indication bank of light emitting diodes (LED) comprises a blue LED, a red LED, and a green LED.

12. The diver alert system of claim 10, wherein the buddy emergency indication bank of light emitting diodes (LED) comprises a red LED and a white LED.

13. The diver alert system of claim 12, wherein the white LED of the buddy emergency indication bank of light emitting diodes may function as a primary source of underwater illumination.

14. The diver alert system of claim 10, wherein the buddy emergency indication bank of light emitting diodes (LED) comprises ultra-bright models of LEDs.

15. The diver alert system of claim 10, wherein the buddy indication bank of light emitting diodes mimic the system indication bank of light emitting diodes on the first side of the circuit board.

16. The diver alert system of claim 10, wherein the buddy emergency indication bank operates in an emergency mode and a signal mode and can be activated automatically by the microprocessor or manually by the diver.

17. The diver alert system of claim 16, wherein in the emergency mode, the buddy emergency indication bank of light emitting diodes flash RED/WHITE/RED/WHITE at a rate of 2 hertz.

18. The diver alert system of claim 16, wherein the emergency mode is activated when a diver's breathing loop partial pressure of oxygen drops below a first preselected threshold value or rises above a second preselected threshold value.

19. A diver alert system for assisting a diver during a dive, said system comprising:

a decompression integrated guidance subsystem controlling a diver's decompression ascent;
a buddy signaling device subsystem for alerting other divers proximal to the diver;
a circuit board;
a microprocessor mounted on a first side of the circuit board; and
multiple light emitting diodes mounted the first side and a second side of the circuit board,
wherein the multiple light emitting diodes mounted the first side and a second side of the circuit board form part of the decompression integrated subsystem and the buddy signaling device subsystem,
wherein the buddy signaling device subsystem operates in an emergency mode and a signal mode, and
wherein the alert system is mounted giving the diver an unobstructed view of the alert system.

* * * * *